United States Patent [19]

Schwartzman

[11] 4,084,379
[45] Apr. 18, 1978

[54] ENERGY CONVERSION SYSTEM

[76] Inventor: Everett H. Schwartzman, 2751 Toledo St., Unit 309, Torrance, Calif. 90503

[21] Appl. No.: 606,790

[22] Filed: Aug. 22, 1975

[51] Int. Cl.² .................. F03G 7/00; F01K 25/00
[52] U.S. Cl. ..................... 60/641; 122/31 R; 60/670; 60/649
[58] Field of Search ............ 60/649, 670, 671, 673, 60/641; 122/31; 165/45

[56] References Cited

U.S. PATENT DOCUMENTS

| | | | |
|---|---|---|---|
| 2,222,575 | 11/1940 | Schutte | 122/31 R |
| 2,561,471 | 7/1951 | Hatfield | 122/31 R |
| 3,845,627 | 11/1974 | Hutchinson | 165/45 |
| 3,988,895 | 11/1976 | Sheinbaum | 60/641 |

Primary Examiner—Allen M. Ostrager
Attorney, Agent, or Firm—Mario A. Martella

[57] ABSTRACT

An energy conversion system for the production of power from hot fluid sources which may contain dissolved solutes and undesirable noncondensable gases is disclosed in which direct heat transfer is utilized by said hot fluid sources to vaporize a working fluid which is then in turn utilized for the production of power. In the given system the working fluid is employed in such a manner as to blanket the appropriate interior surfaces of the apparatus thus preventing contamination by any of the dissolved solutes which subsequently may have precipitated out during the energy conversion stage of the power. Also disclosed is a modification of said energy conversion system whereby any loss of the said working fluid is prevented, thereby eliminating the necessity of their replacement, so that the given system can operate for extended periods of time without the added expense of providing for make-up fluid. Another disclosed feature in the given system is a method by which the noncondensable gases contained in the hot energy source fluid can be separated and then processed where necessary to enable the undesirable elements to be disposed of without injuring the environment. Details in the given disclosures further illustrate the different techniques required to accomplish the desired objects, i.e. efficient production of power, with respect to whether the incoming hot energy source fluid is in a liquid or gaseous state. The system may also be used as a cooling tower without the production of power.

22 Claims, 10 Drawing Figures

ENERGY CONVERSION SYSTEM

BACKGROUND OF THE INVENTION

It has become apparent within recent years that the finite limit to the availability of fluid fossel energy sources indigenous to the earth such as oil and natural gas is being approached. This situation coupled with the increased demand for energy makes it imperative that new sources and their respective conversion to useful forms, i.e. power generation, be found and developed. In view of this situation it seems logical that the remaining types of fossel fuels should be conserved and perhaps utilized only with respect to motive power requirements such as transportation needs. If other energy sources such as geothermal and solar energy are employed for generating electric power, then over 53 percent of our power requirements could be satisfied with an inexhaustible supply of energy. This fact becomes very important when consideration is given to the energy content of available fossil fuels. The fossil fuel contains approximately 16,000 BTU per pound thus making them well suited for the mobile type of applications. On the other hand the amount of useful solar energy that is necessary for supplying any relatively large power need requires large areas for collection, since the intensity of solar energy being radiated to the earth is not large. Thus, from pragmatic considerations solar energy systems would have to be relegated to a stationary type of power generation application. The same situation exists with respect to geothermal energy sources.

The most abundant type of geothermal source consists of hot water supplies which have a relatively low energy content of about 300 BTU/lb. at 400° F when compared to fossel fuels on a weight basis. Because of this fact, this energy source can also only be effectively utilized in a stationary type of power generation application. Due to the low energy content with respect to the heating of liquids by solar radiation or the use of geothermal sources it is necessary to employ very large flow rates of these hot liquid sources in order to obtain the magnitude of power required. The necessity of large flow rates indirectly implies that relatively large equipment sizes would be required and with the specific application of power generation the system would be required to operate for extended periods of time. Inherent in this application are the substantial problems concerning the contamination of the equipment used, mainly the primary heat exchangers, since the fluid energy sources in many cases is saturated with solutes and they tend to precipitate out as solid matter when the equilibrium thermodynamics of these fluids are disturbed by the power extraction process. Therefore, in order for the power extraction from these hot fluid energy sources to be viable a very economical process has to be employed wherein the capital cost and operating cost have to be reasonable with respect to the power output. Thus, the system must not be susceptible to any contamination related to the precipitation of solutes contained in the energy providing sources; must be reasonable with respect to capital and maintenance cost as related to the given power output and effective length of time required to operate; and also must not create any environmental hazards such as pollution.

SUMMARY OF THE INVENTION

This invention sets forth an economical method whereby useful forms of energy, mainly electric power can be produced from hot fluid sources. The hot fluid sources may be those produced by the earth's interior heating potential known as geothermal sources or may also be created by the heating of fluids with solar energy.

It has been determined that the most abundant type of geothermal energy consists of a hot thermally heated fluid usually saturated or ladened with many dissolved solids such as silica, dissolved calcium, calcium oxide, carbonates, and various other soluble salts the most common being sodium chloride.

It also has been proposed that an effective way to obtain solar energy is by the conversion of the sun's radiant energy to heat by means of solar ponds in which high concentration gradients of dissolved salts (i.e. concentrated solution at the bottom and dilute solution at the top of the solar ponds) are utilized to establish a relatively large temperature gradient between the top and bottom of the solar ponds. This temperature gradient is utilized by this invention to directly produce power in an efficient manner with the minimum amount of capital expenditures for equipment.

In general a number of power generating systems have been proposed. For example U.S. Pat. No. 3,757,516 (McCabe) and U.S. Pat. No. 3,845,627 (Hutchinson) both of which employ a separate power producing cycle and thus require the use of large and expensive primary heat exchange equipment.

Although prior systems, as exemplified above, represent substantial progress in the art, a need continues to exist for further improvements, i.e. elimination or substantially reducing the degradation effects of contamination by the precipitation of solutes upon components employed in the existing systems.

In the given invention a novel method is provided whereby these degradations due to contamination are eliminated. This problem is solved, as set forth, by employing a simple direct contact energy exchange in such a manner as to prevent any of the liquids employed, which may contain solutes, from coming into contact with any surfaces of the components used in the system. The present invention also eliminates the necessity of employing a primary heat exchanger which further alleviates the contamination problem and also substantially reduces the cost of the overall system.

Furthermore, in accordance with this invention a system is described, whereby the consumption of the working fluid employed due to "wash out" can be eliminated. Essentially, this invention is a system in which a working fluid, is immiscible in water and which has the desired thermodynamic properties is used to efficiently absorb energy from a fluid source by direct heat transfer and the accompanying phase change of state of the working liquid. This exchange of energy is accomplished by the complete vaporization of the working fluid and a small portion of the liquid fluid source. The composition of the produced vapor is controlled by the given temperature and pressure at which the process takes place and in turn is dependent on the thermodynamic properties of the working fluid employed and the flow rate of both the working fluid and the energy source fluid. The resulting vapor mixture is then utilized directly by expansion through a power producing device such as a turbine to produce power.

One main problem overcome by the apparatus and method of this invention is the energy exchange which takes place without the ensuing contamination problem. This is accomplished by this invention by so employing such working fluids as propane, butane, n-heptane, ethane, ethylene, or mixtures thereof in such a manner as to blanket all of the surfaces of the components used in the energy exchange from the energy source fluid which contains the dissolved solutes. Also, since this system employs essentially an evaporation process similar to that used in desalination systems, all of the solid type impurities are eliminated from the vapor used for extracting energy by the expansion process. The fluids used as the working fluid are chosen with respect to their thermodynamic properties in relationship to that required by the given inlet condition of the energy source fluid. In general, the light hydrocarbons or mixtures thereof are ideally suited for this purpose since they can be tailored to have both the desired thermodynamic characteristics and are almost completely immiscible in the energy source fluid.

However, since the working fluid may be slightly soluble in the energy source fluid (usually a solution of water) a very small portion of the working fluid is lost by being "washed out" with the spent energy producing fluid. This invention further sets forth a system whereby this loss of working fluid is reduced to an insignificant amount by taking advantage of the "salting out" effect which occurs when a solute saturated water solution is used as the energy fluid source. The "salting out" effect is the phenomenon whereby the solubility of the working fluid in the energy producing fluid is greatly reduced when the energy producing fluid is saturated by a solute. In some instances where the energy producing fluid is not saturated, it might be necessary to stage the given process whereby a heavier hydrocarbon working fluid (which is substantially insoluble in the unsaturated energy producing fluid) is used to transfer the energy to an artificially saturated energy producing fluid in order to take advantage of the salting out effect. A convenient salt such as calcium choloride may be used to obtain the desired effect by saturating water whereby the given solution is then used with a light hydrocarbon working fluid to obtain the power by expansion as previously mentioned. This solution of water saturated with calcium chloride also eliminates any corrosion which is normally associated with the common sodium chloride solutions usually encountered.

Furthermore, this invention, by the use of combinations as set forth, can be employed in such a manner that the noncondensible gases such as hydrogen sulfide and carbon dioxide plus the dissolved air if any, can be separated out and conveniently disposed of prior to the power extraction portion of the system and thereby prevent any corrosion effect on the power producing components. Also, by use of this invention these undesirable noncondensible gases can be reinjected into the spent energy source fluid and thus disposed of without any contamination or pollution of the surrounding environment.

Other advantages will be apparent from a detailed consideration of the system as set forth below.

BRIEF DESCRIPTION OF THE DRAWINGS

In the drawings, which constitute a part of this specification, exemplary embodiments exhibiting various forms and features hereof is set forth, specifically.

DESCRIPTION OF THE ILLUSTRATIVE EMBODIMENT

As required, detailed illustrative embodiments of the invention are disclosed herein. The embodiments exemplify the invention which may, of course, be constructed in various other forms some of which may be different from those disclosed herein. However, the specific structural details as disclosed herein are currently deemed to represent the best forms, within that objective, and furthermore effectively provide a basis for the claims which define the scope of the present invention.

Figure 1:
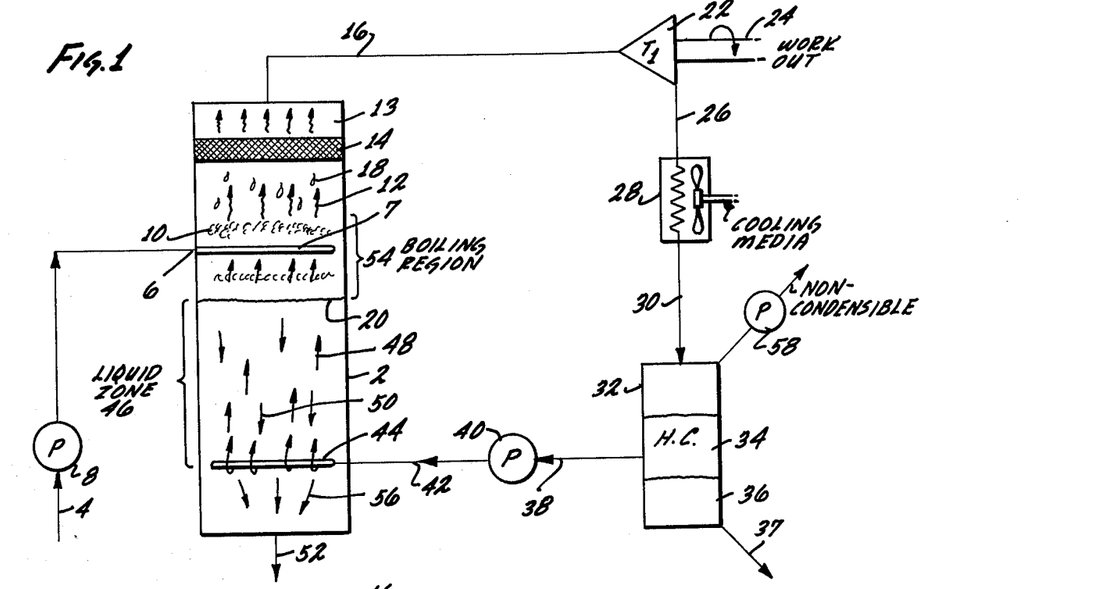
FIG. 1 is a schematic diagram of the basic system constructed in accordance with the present invention.

Referring initially to FIG. 1, a system is illustrated involving an energy transfer portion in conjunction with the power producing embodiment.

Considering the system of FIG. 1 in somewhat greater detail, a pressure vessel or tank 2 receives the hot energy source fluid 4 at point 6. The hot energy source fluid 4 is maintained in a liquid state by pump 8 supplying it at a pressure greater than its saturation pressure at the given inlet temperature. Upon entering into the fluid vessel 2 at point 7 a portion of the hot energy source fluid 4 vaporizes and mixes with the up-coming working fluid vapor at zone 10. The ensuing vapor mixture 12 then flows through the de-mister 14 and exits from the vessel 2 by means of transfer pipe 16. The de-mister 14 prevents any entrained liquid droplets in the vapor mixture 12 from passing through it by being coalesced into large droplets 18 which subsequently return to the liquid mixture portion 20 thus ensuring a pure vapor mixture 13 in transfer pipe 16.

The pure vapor mixture 13 which exits by pipe 16 passes through a power extracting device 22 which may be an expansion engine or turbine thus generating a power output through shaft 24. Upon exhaust of the fluid from the power extraction device 22 the energy content and corresponding pressure and temperature of the spent fluid having been lowered is then transferred by exhaust pipe 26 to the condenser 28 where it is condensed by heat transfer relationship with a heat sink such as cooling water or the surrounding air. The condensed fluid, now in a liquid state, is transferred by pipe 30 to a decanter or vessel 32 where the immiscible working fluid 34 separates from the water 36. The water 36 which may be in a relatively pure state is removed from the system at point 37 for use as cooling water or other needs. The now pure working liquid 34 is transferred by pipe 38 to pump 40 where it is pressurized so as to enable it to enter the pressure vessel 2 via pipe 42 at point 44.

The liquid working fluid 48 as it counter flows in a direct heat transfer relationship with the somewhat spent energy source fluid 50 while passing through the liquid zone 46 effects a heat energy exchange by absorbing all or a substantial portion of the remaining heat content contained in the said energy source fluid 50. As the liquid working fluid 48 proceeds through the energy source fluid 50 it is heated and in turn cools the energy source fluid 50 so that the energy source fluid 50 exits at point 52 substantially depleated of its heat energy content. The liquid working fluid 48 proceeds until it reaches such a state as at point 20 where its temperature in relationship with the pressure maintained in vessel 2 is such as to cause its vapor pressure to be high enough that boiling takes place in region 54. The temperature of the fluid in region 54 is such that the vapor pressure of the working fluid 48 plus the vapor pressure of the energy source fluid 4 is equal to the working pressure contained in vessel 2 thus boiling the mixture in region 54 to produce the vapor 12.

By proper control of the mass flow relationship between the energy source fluid 4 and the working fluid 48 an efficient energy exchange takes place whereby all of the working fluid 48 is vaporized in region 54 and whereby in conjunction with this energy exchange process the energy source fluid 4 is depleted of its heat content by direct heat transfer in a liquid to liquid energy exchange which occurs in liquid zone 46 and thus ensuring that the spent energy source fluid 56 exhausts at point 52 at essentially the ambient temperature. An appropriate working fluid composition is dependent on the given temperature of the energy source fluid and could be, but not limited to, such fluids as propane, butane, n-heptane, or mixtures thereof which are immiscible in the energy source fluid 4 in their respective liquid states and would be tailored to have the required thermodynamic properties to carry out the aforesaid energy transfer. The appropriate working pressure required to carry out the energy transfer is maintained by pump 8 and pump 40 for the energy source fluid 4 and the working fluid 34 respectively.

The noncondensible gases which are dissolved in the energy source fluid 4 are exhausted from the decanter or vessel 32 by a suitable pump or compressor 58 and depending on the composition of the noncondensible gases are disposed of in an appropriate fashion so as not to polute the environment or the surrounding area. The potable water obtained in the bottom of decanter 34 is removed at point 37 and used as needed or as subsequently described.

Figure 2:
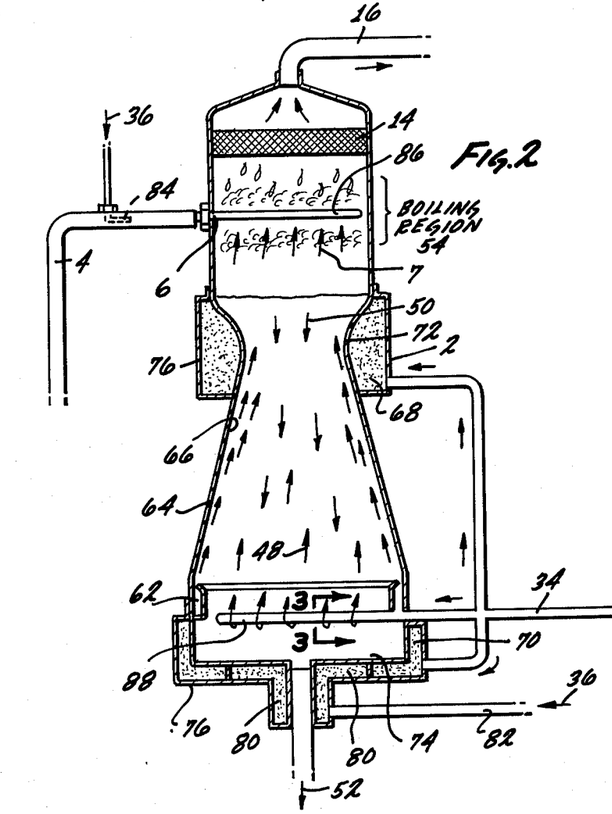
FIG. 2 is a detailed drawing of the main component in the energy exchange apparatus showing the specific design features employed in accordance with the present invention.

FIG. 2 is a detailed drawing showing the construction of vessel 2 and which illustrates the manner in which the accumulation of any solid matter which might precipitate out of the energy source fluid is prevented from impairing the operation of equipment in accordance with this invention.

In many applications the energy source fluid contains dissolved solid matter such as various salts which would have the tendency to precipitate out when the equilibrium conditions are disturbed by the energy extraction process, i.e. the cooling of the energy source fluids. Accordingly, vessel 2 is constructed in such a manner whereby a portion of working fluid 34 is injected around the bottom circumference of vessel 2 by means of inlet manifold 62. The vessel 2 can be constructed with a slight wall taper 64 so that its inner surface 66 is completely blanketed by the flow of the working fluid 34 so as to prevent any contact of surface 66 of the vessel by the energy source fluid 4 containing some precipitated solid matter. In areas such as portions 68 on the sides of vessel 2 and portion 70 on the bottom of said vessel 2 porous surfaces 72 and 74 respectively are employed through which a small portion of the pure working fluid 34 is injected into the interior of vessel 2. The flow of the working fluid 34 through these said porous surfaces 72 and 74 and in conjunction with the upward flow of the pure working fluid along the sides of the said taper 64 completely blankets the interior surfaces thereby preventing any accumulation of solid matter. Sections such as 68 and 70 are constructed of an outer solid shell 76 and porous inner wall 72 and 74 respectively so as to form a containing volume which will accommodate and distribute the small portion of the working fluid 34 to adequately blanket the required portions of the inner surface 66 in those areas necessary to prevent any accumulation of solid material. By means of the same type of construction a volume 80 is provided in which a small portion of the pure water 36 can be injected via intake pipe 82 to prevent the accumulation of any solid material on the remaining bottom surface of vessel 2 and in the spent energy source fluid exhaust pipe structure at point 52.

When necessary a small portion of the pure water 36 is injected into the incoming energy source fluid 4 at point 84 in order to somewhat desaturate the fluid so as to prevent any accumulation of solid matter in the distribution manifold 86 at points where the energy source fluid is injected into the interior of vessel 2.

Figure 3:
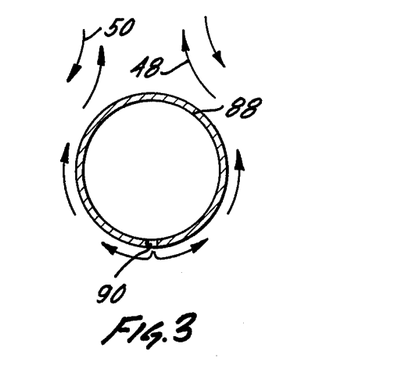
FIG. 3 is a cross-section of a detail port as employed in FIG. 2.

FIG. 3 shows a cross-section of a working fluid inlet feed tube 88 in which the pure working fluid 34 is injected into the interior of vessel 2 by means of slots 90 on the bottom of tube 88 so as to completely blanket this tube 88 as the working fluid flows around it and then proceeds through the liquid zone 46 towards the boiling zone 54. By means of the geometry of construction in accordance with FIG. 3 the energy source fluid is prevented from contacting one of the exterior surfaces on the inlet feed tube 88 so as to effectively prevent any accumulation of solid matter.

Generally, the system of FIG. 1 is relatively inexpensive to construct and in spite of that consideration may be designed to attain a reasonably high level of efficiency. However, in some situations, it may be desirable to employ a more elaborate system in the interest of substantially increased efficiency.

Figures 4, 6, 8:
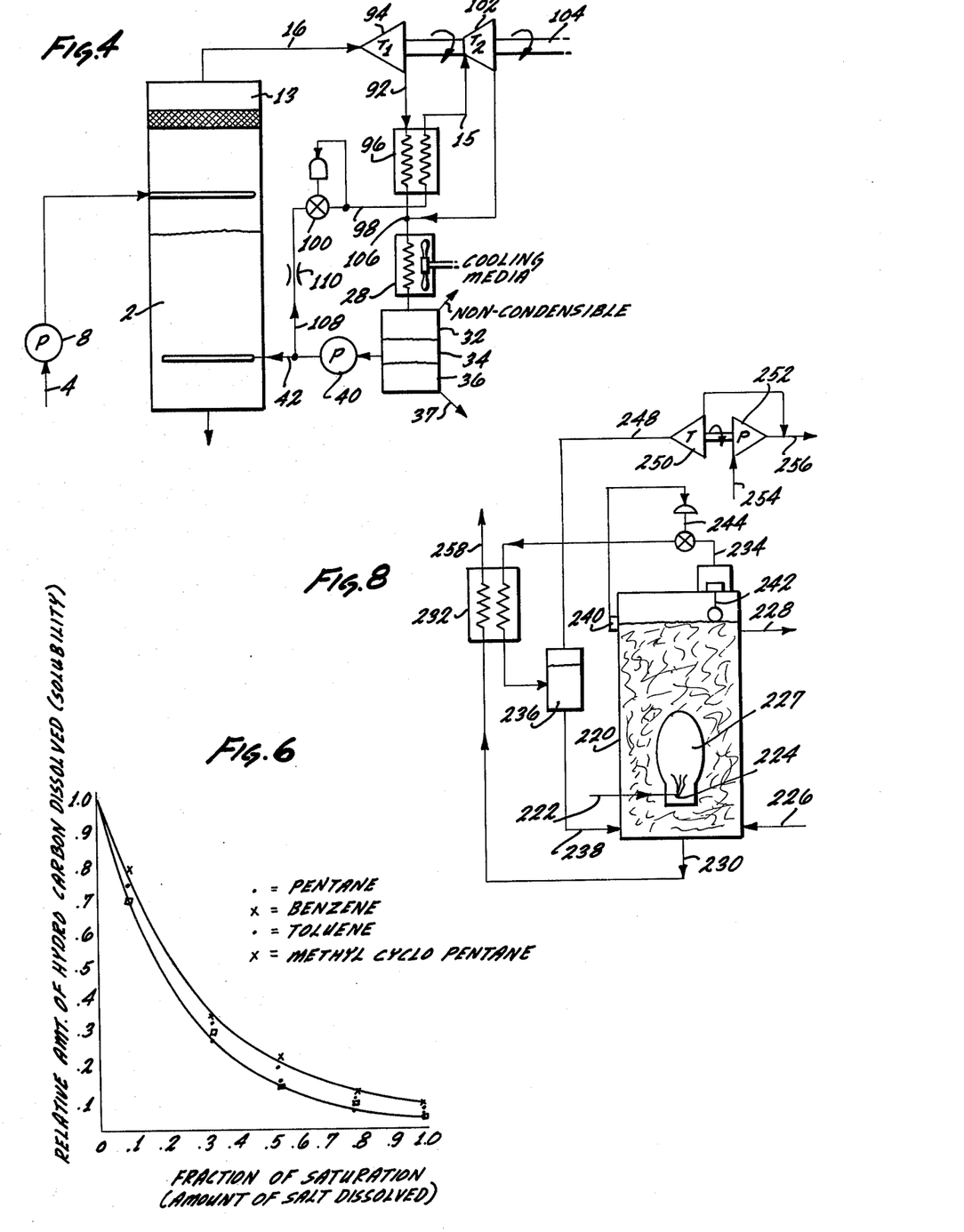
FIG. 4 is a schematic diagram of another system constructed in accordance with the present invention whereby the power producing segment of the system is staged in order to increase the overall efficiency in accordance with the invention.
FIG. 6 is a graph illustrating the decrease in solubility of the working fluid in the energy source fluid as a function of the amount of salt dissolved in the said energy source fluid.
FIG. 8 is a schematic diagram of a portion of another system constructed in accordance with the present invention showing the system of separating out the non-condensible gases when the incoming hot energy source fluid consists mostly of vapor.

The system shown in FIG. 4 can be employed in situations where maximum conversion efficiencies are desirous and is comprised of two stages or where required can be extended to multi-stage power extracting embodiments. With appropriate thermodynamic considerations in conjunction with the energy exchange portion of the process, this embodiment can attain a condition whereby the working fluid and vaporized water of the vapor mixture 13 is somewhat superheated. This condition can be made to occur when the energy source fluid inlet temperature exceeds 300° F. In this system the vapor mixture 92 exhausting from the expansion device 94 may still contain usable energy. This energy is utilized by heat exchange in the regenerator heat exchanger 96 with a portion of the working fluid 98 which is previously reduced to the required pressure by throttle valve 100 prior to its entrance into said regenerator heat exchanger 96. This working fluid 98 is vaporized in said regenerator 96 and is then expanded in the work producing device 102 whereby more useful work is produced in addition to that produced by work producing device 94. The resulting work is utilized by transfer through output shaft 104.

The exhausting working fluid from extraction device 102 meets with the exhausting working fluid 92 from extraction device 94 at the common junction 106 whereby they both mix and proceed to the condenser 28 thence are condensed into a liquid state and further proceed to decanter 32. The pure liquid working fluid 34 thus separated by the nature of it being immiscible, in said decanter 32 is then pressurized by means of pump 40 where a portion of said working fluid is transferred by pipe 42 to pressure vessel 2. The remaining portion of the said working fluid is transferred by pipe 108 to throttle valve 100 where the desired pressure level is obtained and maintained so that this portion of the working fluid will be vaporized by heat exchange relationship with working fluid 92 in the regenerator heat exchanger 96.

A control orifice 110 can be employed to establish the correct mass flow relationship between working fluid 92 and 98 respectively in order to accomplish the desired energy exchange and also to ensure a superheated vapor mixture 15 without any sacrifice in efficiencies. Thus, the invention in accordance with FIG. 4 accomplishes the desired power generating effect very efficiently by extracting all of the useful energy contained in the working fluid 13 and transferred by pipe 16 to the power generating portion of the system by in effect staging the power producing portion of the system, so that the total amount of spent working fluid entering the condenser 28 is at its saturated condition as determined by the temperature of the cooling media and the necessary pressure maintained in the said exhausting working fluid.

Figure 5:
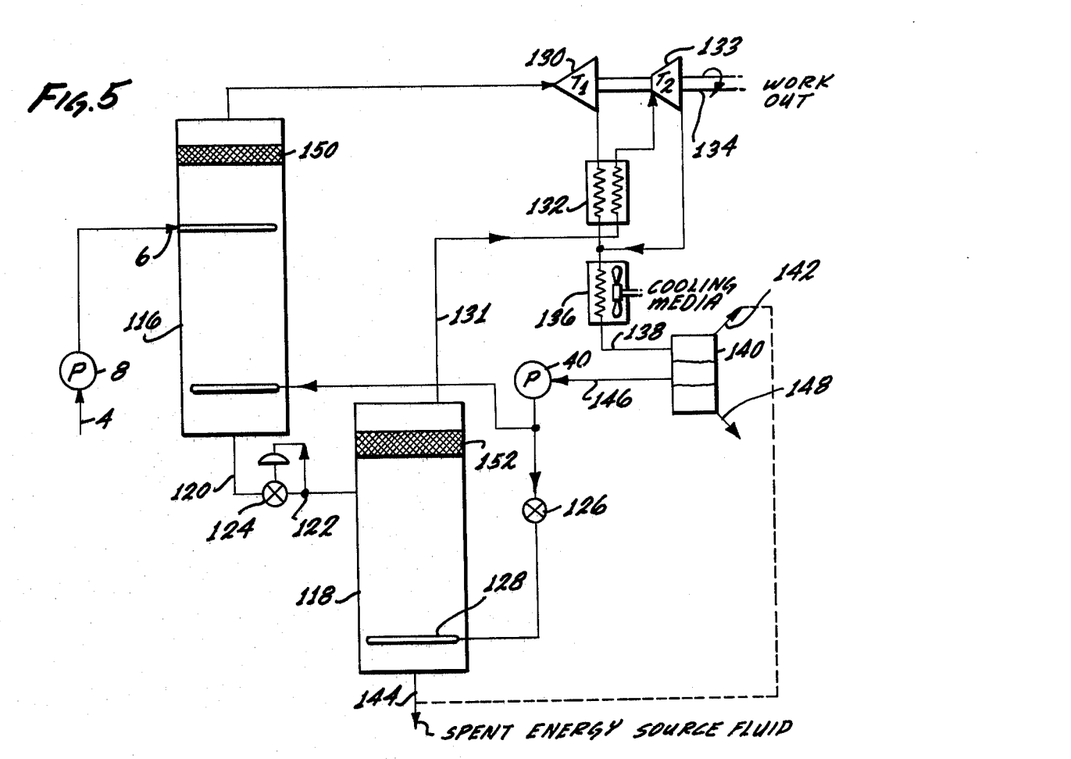
FIG. 5 is a schematic diagram of yet another system constructed in accordance with the present invention whereby the energy exchange segment of the system is staged in order to more effectively obtain the usable energy contained in the incoming hot energy source fluid.

An alternate to the system described in FIG. 4 in which a highly efficient overall power generation effect is obtained in those cases where the energy source fluid's inlet temperature exceeds 300° F is now described as shown in FIG. 5. In this invention the energy extraction portion of the invention is staged in order to effect a high power conversion efficiency. With specific reference to FIG. 5 two energy conversion vessels 116 and 118 constructed in accordance and as previously described and illustrated by FIGS. 2 and 3, are utilized in such a fashion that any residual heat energy not connected by the working fluid in vessel 116 is conveniently obtained in the same manner as previously described in vessel 118. In order to effectuate the desired energy conversion vessel 116 is operated at a pressure and temperature level which is higher than the pressure level and temperature range maintained in vessel 118. The required pressure level, which is dependent on the working fluid composition and inlet temperature of the hot energy source fluid, is maintained by pump 8 which keeps the inlet hot source fluid at the pressure level required in vessel 116. In like manner working fluid pump 40 maintains the working fluid at the same desired pressure level in vessel 116. Whereupon, when the desired energy conversion has taken place in vessel 116 the somewhat spent energy source fluid proceeds to vessel 118 via transfer lines 120 and 122 respectively. A pressure reducing valve 124 is secured between lines 120 and 122 in order to maintain the required pressure in vessel 118. In like manner a pressure reducing valve 126 is employed to maintain the desired pressure level of the working fluid entering vessel 118 at the point 128. The required pressure to be maintained in vessel 118 is determined by the overall processes' thermodynamic considerations and depends mainly on the energy source fluid's inlet temperature at point 6 and the composition of the working fluid used.

In general the energy source fluid leaving the first stage via line 120 and 122 becomes the input energy source fluid to the second stage, i.e. vessel 118. The vapor output from vessel 116 which consists of a vapor mixture whose composition is mostly that of the working fluid plus a little water vapor is utilized by direct expansion in turbine 130. The exhausting fluid from turbine 130 is further cooled in regenerative heat exchanger 132 by the vapor output from vessel 118. The vapor output 131 from vessel 118 (the second energy conversion stage) upon being heated in turn by said regenerative heat exchanger 132 is then expanded in turbine 133 to produce useful work. Thus the total amount of work produced consists of that obtained in turbine 130 and turbine 133 and can be utilized for power generation by being transmitted through output shaft 134. The exhausting fluid from turbine 133 enters the condenser in conjunction with the exhausting fluid from said regenerative heat exchanger 132. The total exhausted fluid vapor is then condensed in condenser 136 by an appropriate and available cooling media such as air or cooling water. Upon condensation this liquid then enters decanter 140 via transfer line 138. In said decanter 140 the noncondensible gases are exhausted at point 142 to be disposed of either by exhausting directly to the atmosphere if they are of a nonharmful character or by reinjecting them into the spent energy source fluid at point 144 prior to their being reinjected into the earth with the spent energy source fluid. The decanter vessel 140 also serves as the container in which water and the working fluid separate by the fact that they are immiscible in each other. The working fluid proceeds from the decanter 140 via transfer pipe 146 to said pump 40 thus enabling the given process to operate in a continuous manner. The separated water is exhausted from said decanter 140 by means of exhaust pipe 148. This water can be used for any application requiring potable water such as for personal use, irrigation, or cooling water to be used in a cooling tower if one is employed. Also, if necessary a portion of said water can be reinjected into the incoming energy source fluid at point 4 as described previously and illustrated in FIG. 2. As illustrated previously, de-misters 150 and 152 are employed in energy exchange vessels 116 and 118 respectively in order to ensure that no entrained liquid particles are passed on to the expansion devices, i.e. turbines or engines 130 and 133.

Another very important factor resulting in the use of this invention as set forth in FIG. 5 is that the vapor effluent from the top of vessel 116 can be obtained in a superheated state so that upon its expansion through turbine 130 undue amounts of liquid condensate which may be injurious to said turbine 130 are eliminated. This situation is obtained by using the correct mass flow ratios as between the energy source fluid and the working fluid thus used. The desired superheat thus obtained is dependent on the inlet temperature of the energy source fluid, pressure level maintained in said vessel 116 and said mass flow ratio. Likewise to effect an efficient overall energy conversion process, pressure vessel 118 is utilized to convert the remaining available energy in the somewhat spent energy source fluid exhausting from said pressure vessel 116. In most instances the vapor effluent from the top of pressure vessel 118 would be in its saturated state. However, by utilization of the heat exchanger relationship between said effluent vapor from vessel 118 in conjunction with the exhaust fluid from said turbine 130 by means of regenerative heat exchanger 132 the vapor utilized by expansion through turbine 133 can itself be superheated so that upon its expansion through said turbine 133 no undue amount of liquid condensate will occur and thus prevent any damage to turbine or expansion engine 133.

FIG. 6 is an illustration of the "salting out" effect, whereby the solubility of some possible working fluid selections is decreased to an insignificant amount so that the overall process can be fully utilized and operated in a continuous manner without the necessity of adding any make up of the working fluid which otherwise would have been "washed out" and lost by being in solution with the spent energy source fluid. FIG. 6 shows specifically the decrease of the solubility of some possible working fluids as a function of the saturation of the energy source fluid by dissolved salts. As previously mentioned, calcium chloride would be an appropriate salt to use for saturating the intermediate energy source fluid, as subsequently described, because of its noncorrosive nature. FIG. 6 shows this decrease in solubility for a number of general types of fluids "which are only slightly soluble in water and further substantiates the fact that the decrease in solubility of the given working fluid in the energy source fluid, which is a water base solution, can further be decreased to approximately 1/20 of their initial value in pure water. By the use of this phenomena the "washing out" effect and corresponding loss of working fluid can be limited to such an insignificant amount so that the overall process can be fully utilized in a continuous manner without the added cost of making up the working fluid. The advantages of this invention and the method for utilizing this "salting out" phenomena is shown in FIG. 7.

Figure 7:
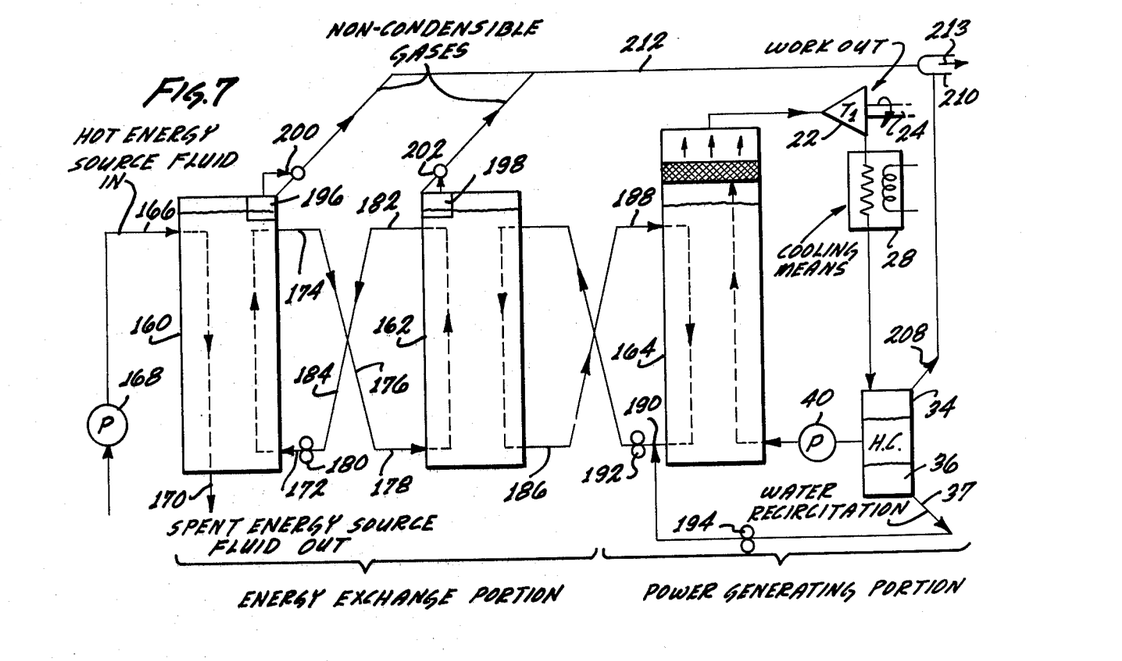
FIG. 7 is a schematic diagram of another system constructed in accordance with the present invention showing the utilization of the "salting out effect" as illustrated in FIG. 6, thus preventing excess "wash out" of the working fluid; and also illustrating the system of separating out the non-condensible gases.

FIG. 7 illustrates this invention as related to the process and method whereby the said "wash out" of the working fluid is prevented. For illustrative purposes three main energy exchange vessels are shown and are represented by 160, 162, and 164 respectively. The hot energy source fluid, which may not be completely saturated with solutes enters at point 166 at a pressure somewhat higher than its saturated vapor pressure corresponding to its inlet temperature at point 166. This pressure is obtained and maintained by pump 168 which either may be located at the well head or down the well hole. The hot energy source fluid flows in heat transfer relationship in a counterflow direction in conjunction with a transfer fluid that is immiscible in the hot energy source fluid all within said vessel 160.

The immiscible transfer fluid may be of the heavier hydrocarbon types such as heptane, octane, nonane, mixtures thereof, and other appropriate fluids which are essentially immiscible in water. Some whole oils, topped oils, and distillation fractions thereof, depending on their respective original source may also be well suited since certain of these natural oils are almost completely insoluble or immiscible in water. (Reference: *Solubility of Hydrocarbons and Petroleum in Water*, L. C. Price, University of California, Riverside, March 1973). The spent energy source fluid exhausts at point 170 at the bottom of vessel 160 to be reinjected into the earth or otherwise conveniently disposed of without polluting the environmental surroundings.

The transfer fluid enters the bottom of vessel 160 at point 172 to be heated by the counterflowing energy source fluid in vessel 160. The thus heated transfer fluid exhausts at the top of vessel 160 at point 174 and is directed and transported by means of transfer pipe 176 to the bottom of the intermediate vessel 162. The transfer fluid in its heated state enters vessel 162 at point 178 and proceeds in direct heat transfer relationship by flowing in a counterflow relationship with the saturated solution of water and a suitable salt such as calcium chloride. The transfer fluid exchanges its heat energy content with the saturated water solution thus in effect making the artificially saturated water solution the hot energy source fluid with respect to the third vessel 164. The transfer fluid is circulated by a suitable pump 180 which is located just prior to entrance of the transfer fluid to vessel 160 at point 172. The intermediate vessel 162 which is employed for obtaining an energy exchange by direct heat transfer relationship whereby the transfer fluid is thus cooled by the artificially saturated water solution containing a salt such as calcium chloride which in turn is itself heated as it flows in counterflow relationship with the transfer fluid.

The transfer fluid exhausts from vessel 162 at point 182 and proceeds to said circulation pump 180 by means of transfer pipe 184. The artificially saturated water solution after being heated in vessel 162 by the transfer fluid exhausts from the bottom of vessel 162 at point 186 and is transferred to the top of vessel 164 where in its heated state it enters vessel 164 at point 188. Vessel 164 is equivalent to the function of vessel 2 as described in FIG. 1. Vessel 164, turbine 22, condenser 28, decanter 34, pump 40, and the other necessary components which comprize the power generating portion of this system and works in the same fashion as previously described in FIG. 1. The water 36 leaving the decanter 34 at point 37 is reinjected by pump 194 into the main artificially created saturated water solution at point 190 just prior to the circulating pump 192 which in turn circulates and maintains the said water solution at its required pressure so as to accomplish its previously described objectives.

The water 36 that is reinjected at point 190 thus assures that this invention can operate in a continuous fashion without any depletion of any of the working and transfer fluid and thereby maintains complete equilibrium as to all of the said fluid's quantities as utilized to produce power via shaft 24 which is the output from turbine 22. The main objective of this invention as just described and illustrated by FIG. 7 is to accomplish the production of power without any "wash out" or loss of the power generating working fluid and transfer fluids used. To restate, this is accomplished by the use of an artificially saturated water solution using an appropriate noncorrosive salt so as to take advantage of the salting out phenomena and thereby reduce the solubility of the power generating fluid used in the power generating portion of this cycle or process, i.e. vessel 164 and the other previously mentioned components. Since the power generating working fluid may be of the lighter type of hydrocarbons it is necessary to prevent their loss by the just described invention. In this invention the heat energy is transferred from the natural hot energy source fluid which may not be saturated by means of an immiscible fluid, which may be of an heavier type of hydrocarbon composition or other suitable immiscible fluids to an intermediate artifically saturated energy source fluid which by being saturated renders itself such that the power generating or working fluid is not significantly soluble in it, thereby preventing the lose of any of the said working fluid.

The liquid level in vessels 160 and 162 can be maintained by a float arrangement or any other suitable means such as electronic level sensing means employed in conjunction with controlled vent valves as represented schematically in FIG. 7 by numbers 196 and 198. By the use of this liquid level control and vent valves the noncondensible gases can be vented from the given system at the corresponding points 200 and 202 and disposed of by either reinjecting them into the spent energy source fluid exhaust at point 170 or exhausted to the atmosphere if they are of a nonpoluting and harmless nature. Also, by the use of this just described method for the separation of the noncondensible gases the injurious effects of such corrosive noncondensible gases such as hydrogen sulfide which may harm the components employed in the power generating portion of the system may thus be prevented. The expelled noncondensible gases from points 200 and 202, since they are at elevated pressures with repect to the atmospheric pressure can be effectively employed to remove the remaining residual noncondensible gases 208 from said decanter 34 by use of a suitable ejector 210 or in the alternative by use of a turbine driven vacuum pump whereby the turbine is driven by said noncondensible high pressure gases as directed by transfer pipe 212 to said turbine. Then the total non-condensible gases exhausting at point 213 can be disposed of by the appropriate method as previously described.

Likewise this just described invention as illustrated in FIG. 7 can be extended to those situations where the hot energy source fluid might be in the form of a gas containing undue amounts of polluting, corrosive, or harmful gases such as hydrogen sulfide. The major component of the said hot energy source fluid which may be in a gaseous form would in most cases be composed of steam (water vapor) with the remaining being gases whose thermodynamic properties at the temperature and pressure ranges in which the required energy exchanges take place are such that these gases would not condense. By means of this invention with reference to FIG. 8 which is illustrative of a portion of the invention whereby the given effect is utilized to separate out the said noncondensible gases and thereby render them available for convenient disposal by reinjection into the spent and recondensed (liquid) energy source fluid.

As can be seen by referring to FIG. 8 in conjunction with reference to FIG. 7 the vessel 160 is replaced by vessel 220 in which the hot energy source fluid consisting of vapor enters said vessel at point 222 and is dispersed at point 224. In this form a much greater mass flow of the transfer fluid is utilized whereby by direct heat transfer relationship this transfer fluid which enters vessel 220 in a cool liquid state at point 226 and exhausts from said vessel in a heated liquid state at point 228 is utilized as the energy transfer means as explicitly set forth by the description with respect to FIG. 7. The main distinguishing difference being that the said heat transfer fluid while it is being heated in turn condenses the condensible vapor (water vapor) of the incoming hot energy source fluid in region 227. The thus condensed fluid liquid consisting of water is exhausted in a cool temperature condition at point 230 for either convenient disposal or use as cooling water, irrigation purposes, or whatever other purposes which may be desired or required.

As specifically shown in FIG. 8 this cooled water can then be utilized, if necessary, in heat exchanger 232 to cool the noncondensible gases exhausted from vessel 220 at point 234 so as to "knock-out" any of the residual transfer fluid vapors by recondensing them in said heat exchanger 232 whereby they are collected in "knock-out" drum 236 and reinjected into vessel 220 at point 238. The liquid level in vessel 220 is maintained by a suitable float 242 or in the alternate by an electronic level sensing means 240 in conjunction with the required control valve 244 as shown schematically in FIG. 8. The cooled noncondensible gases thus obtained from the "knock-out" drum 236 which are approximately at the same pressure as the incoming hot energy source fluid are then used as the power source to further evacuate the residual noncondensible gases from the power producing section of this invention as previously described in FIG. 7.

Specifically the cooled noncondensible gases leaving "knock out" drum 236 are directed to turbine 250 by means of transfer pipe 248 where they are expanded to produce useful work for driving the vacuum pump 252 directly attached to said turbine 250. The said vacuum pump 252 is employed to remove the remaining residual noncondensible gases from the power producing portion of this invention as previously described in FIG. 7. These said residual noncondensible gases from said power producing portion of this process enter the vacuum pump at point 254 and are then elevated in pressure so as to be expelled with the gases exhausting from turbine 250 at point 256.

In the alternative, an appropriate ejector means, as further illustrated in FIG. 7, can be employed to evacuate the said residual noncondensible gases from the power producing section of this invention, whereby the said noncondensible evacuated gases are elevated in pressure by the expansion in the ejector of the said pressurized cooled noncondensible gases obtained from the "knock out" drum. The gases exhausted from point 256 can then be processed by any appropriate means to render the polluting components harmless such that they may be disposed of without polluting the environment by either direct exhausting of the nonpolluting constituents into the atmosphere in conjunction with the reinjection of the remaining polluting or harmful constituents into a portion of the exhausting water leaving said heat exchanger 232 at point 258 for reinjection back into the earth.

Figure 9:
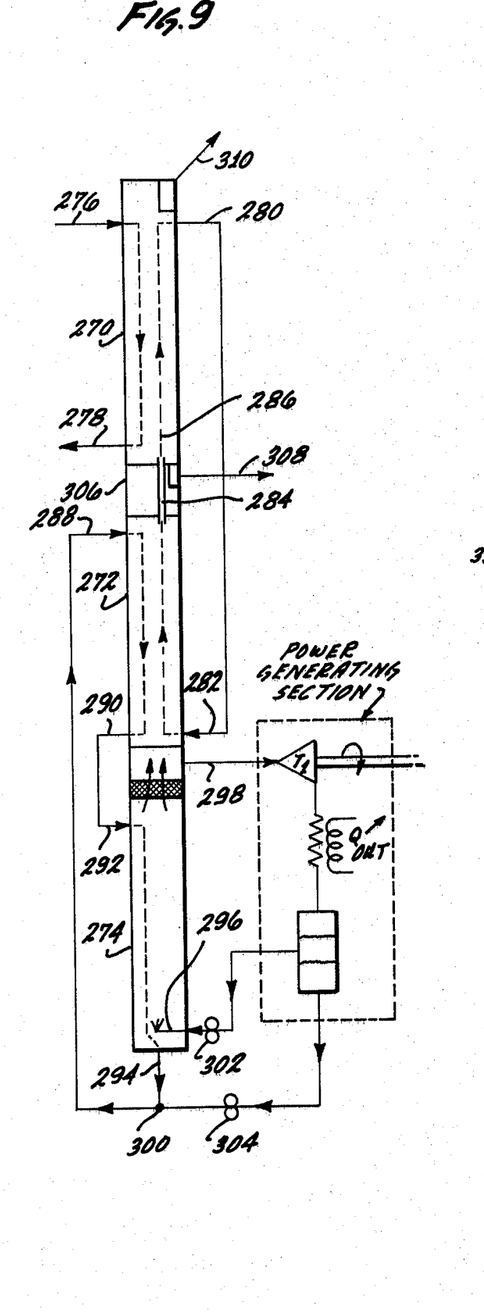
FIG. 9 is a schematic diagram of the system as represented in FIG. 7 showing another geometrical arrangement of the required components in accordance with the present invention.

FIG. 9 is illustrative of an alternate form of the invention which may be better suited in certain cases since it requires less ground space than the other mentioned forms. Its principle of operation is identical to that as described by FIG. 7 in which the hot energy source fluid is in a liquid form. To recapitulate the energy exchange method as set forth by this invention: vessel 270 is employed to contain and direct the energy source fluid in direct heat exchange relationship with an appropriate heat transfer fluid, while vessel 272 is employed to contain and direct the heat transfer fluid in direct heat exchange relationship with an appropriate artificially saturated water solution containing an appropriate dissolved salt and vessel 274 is employed to contain and direct the said artifically saturated water solution in direct heat exchange relationship with an appropriate power generating or working fluid. The flow path of the said energy source fluid is represented by its entering vessel 270 at point 276 in its original heated state and exhausting from said same vessel in a cooled state at point 278. The heat transfer fluid's flow path is illustrated by its exhausting from vessel 270 in a heated state at point 280 and entering vessel 272 in same heated state at point 282. The said heat transfer fluid leaves said vessel 272 in a cooled state at point 284 and enters vessel 270 in the same cooled state at point 286. The flow path of the artificially saturated intermediate power source fluid enters vessel 272 in a cooled state at point 288 and leaves same vessel in a heated state at point 290. Said artificially saturated intermediate power source fluid enters vessel 274 in same heated state at point 292 and leaves same vessel in a cooled state at point 294 minus a small portion which is vaporized in conjunction with the working fluid. The working fluid's flow path is such as illustrated in FIG. 9 by entering vessel 274 at point 296 and leaving the same vessel with said vaporized portion of the water from the said artifically saturated solution at point 298 to be utilized in the power generating section. The liquid water from the power generating portion of this invention reenters the artifically saturated liquid flow loop at point 300, while the condensed working fluid enters vessel 274 in its liquid state at point 296. Pumps 302 and 304 pressurize the working fluid and liquid water respectively thus maintaining continuous operation of the given invention.

In effect, the heat content of the hot energy source fluid is transferred from vessel 270 to vessel 272 and then to vessel 274 from which the exhausting vapor effluent is utilized in the power generating portion for the production of power.

Intermediate section 306 is employed as the volume by which the noncondensible gases are collected and then expelled at point 308, while other noncondensible gases are expelled from the top of vessel 270 at point 310. Suitable valving in conjunction with liquid level sensing means or in the alternative a float valve arrangement is used prior to points 310 and 308 to maintain the required liquid level in vessels 270 and 272 respectively.

Figure 10:
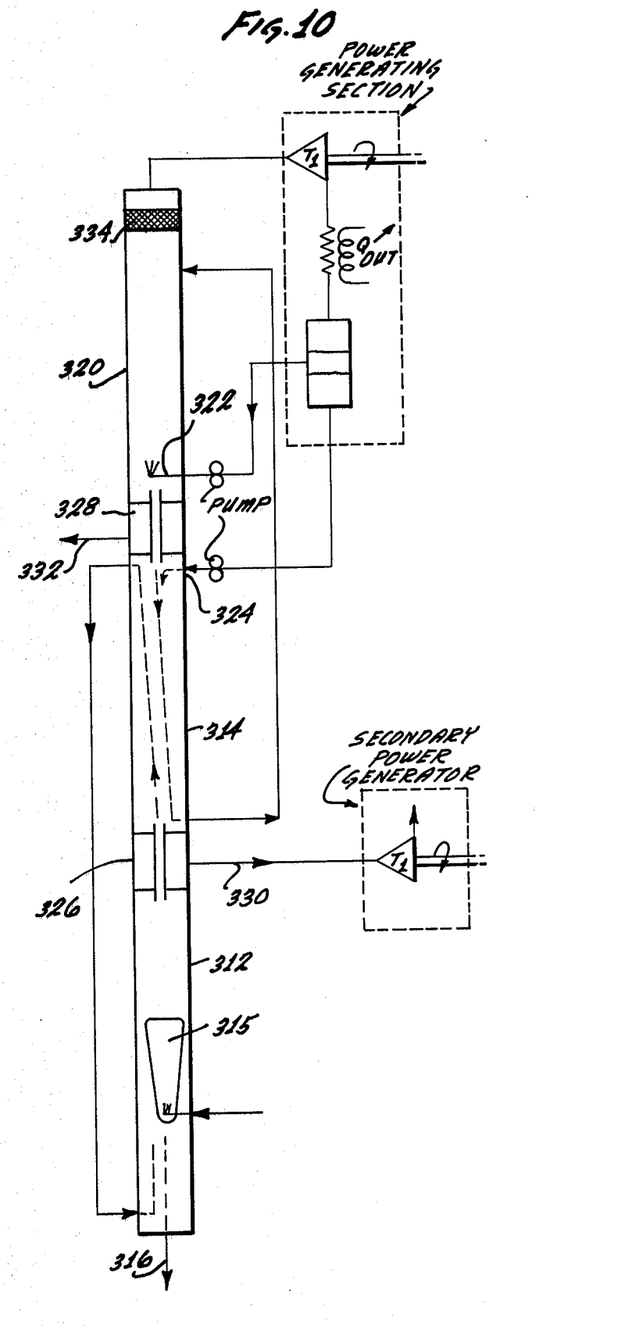
FIG. 10 is a schematic diagram of another form of the system of the present invention in which the energy source fluid includes steam and one or more noncondensible gases.

FIG. 10 is still another layout arrangement and as illustrated can be employed where the hot energy source fluid is in a vapor form comprised of steam and noncondensible gases. This configuration's principal of operation is identical to that as described in detail in FIG. 8.

In effect, the heat content of the hot energy source fluid in gaseous form is transferred from vessel 312 by means of an appropriate immiscible heat transfer fluid to vessel 314. This heat energy transfer is accomplished by the condensing of the water vapor in the given hot energy source fluid in region 315 and in turn thus heats the heat transfer fluid. The resulting condensed liquid (mostly water) is subsequently cooled to approximately ambient temperature in the bottom of vessel 312 by the cool incoming heat transfer fluid and is then expelled and exhausted at point 316. The said heated heat transfer fluid in turn exchanges its heat energy with an appropriate artificially saturated intermediate fluid in vessel 314. The resulting hot intermediate artificially saturated fluid is subsequently used to exchange its heat content with an appropriate working fluid in vessel 320. The vapor effluent from vessel 320 is utilized in the power generating section for the production of power. The recondensed water from the artificially saturated intermediate fluid exhausting from the power generating section is recirculated and reinjected into vessel 314 at point 324.

Intermediate sections 326 and 328 in conjunction with appropriate liquid level control means is used as the collecting volumes for the noncondensible gases which are expelled from the system at points 330 and 332. Since these noncondensable gases are at elevated pressures they in turn can be utilized for secondary power production by expanding them through a turbine and thereby either produce power for driving a vacuum pump as previously explained, or for the production of electric power to operate the auxiliary equipment such as the pumps, etc.

A demister 334 is employed at the top of vessel 320 in order to prevent any liquid "carry-over" into the power generating section of this invention.

It is to be pointed out that either layout as depicted in FIGS. 9 and 10 can be used either where the hot energy source fluid is in a liquid or gaseous phase.

While the above disclosure has referred to geothermal source fluids as the principal heated fluid source material, it will be apparent that the heated fluid source material may originate from other sources. For example, many industrial processes produced heated water or heated water solutions as a by-product of processing, e.g. nuclear power plants, sugar refining, heated cooling water, which is discharged and sometimes is considered a source of thermal pollution. By the present invention, such heated fluid source material may be cooled, with some recovery of power, and disposed of without being considered a thermal pollutant. It is to be understood, that the effectiveness of the system as a power source depends upon a sufficiently high temperature such that thermodynamic consideration favor power generation. However, there may be other considerations, such as ecological considerations, which require cooling of a heated fluid source before discharge and in which the capital expense is justified merely to solve the ecology problem. This invention provides an adjunct in the sense that the ability to produce power, albeit at a perhaps less efficient level because of thermodynamic considerations, may be economically attractive.

Thus, there may be instances in which the energy conversion system of this invention is used as a cooling tower. Where the heated fluid source is above ambient but below about 150° F, the fluid may not have sufficient heat content for power generation but it is sufficiently hot to be a source of thermal pollution. The system of the present invention may be used to reduce the heat content to an acceptable level without the generation of power.

Various other modifications and changes in the invention as disclosed herein will be readily apparent to those skilled in the art. As a consequence, the scope hereof shall be deemed to be in accordance with the claims as set forth below.

I claim:

1. An energy conversion system for extracting heat from a heated aqueous fluid source material selected from the group consisting of geothermal and solar heated source fluids, and waste heat water solutions from power plants and industrial processes, which may contain dissolved solutes therein, comprising the steps of:

introducing a working fluid and said heated fluid source material into a vessel to effect contact therebetween for effecting direct heat transfer from said heated fluid source material to said working fluid whereby the combined vapor pressure of the heated aqueous source material and of working fluid being equal to the working pressure in the vessel thereby to effect boiling of the mixture of heated aqueous fluid source material and the working fluid, the temperature of boiling of said mixture being lower than the individual boiling points of each of the heated aqueous fluid source material and of the working fluid at the working pressure of said vessel such that said working fluid is vaporized to produce a vapor effluent while said heated fluid source material is cooled, effecting substantially unobstructed counter current flow of said working fluid and said heated aqueous fluid source material through said vessel to inhibit and to minimize precipitation of dissolved solutes in said vessel as said heated aqueous fluid source material is cooled and preventing accumulation of precipitated solids from said fluid source material on the walls of said vessel by flowing a portion of the working fluid along the walls of said vessel, said working fluid being immiscible with said heated fluid source material, withdrawing said cooled fluid source material from said vessel, condensing the working vapor from said vessel into a working liquid, and recirculating said condensed working liquid to effect introduction of the formed working liquid into said vessel on a continuous basis.

2. A method of generating power from a heated aqueous fluid source material selected from the group consisting of geothermal and solar heated source fluids, and waste heat water solutions from power plants and industrial processes, which may contain dissolved solutes therein, comprising the steps of:

introducing a working liquid and said heated fluid source material into a pressure vessel to effect contact therebetween for effecting direct heat transfer from said heated fluid source material to said working liquid whereby the combined vapor pressure of the heated aqueous source material and of the working fluid being equal to the working pressure in the vessel thereby to effect boiling of the mixture of heated aqueous fluid source material and the working fluid, the temperature of boiling of said mixture being lower than the individual boiling points of each of the heated aqueous fluid source material and of the working fluid at the working pressure of said vessel such that said working liquid is vaporized to produce a working vapor effluent and the fluid source material is withdrawn from said vessel after heat exchange, effecting substantially unobstructed counter current flow of said working fluid and said heated aqueous fluid source material through said vessel to inhibit and to minimize precipitation of dissolved solutes in said vessel as said heated aqueous fluid source material is cooled, introducing a pure fluid at selected points in the process flow to contact surfaces of the process equipment to minimize accumulation of solid matter on such surfaces, introducing said working vapor effluent into a power producing device for producing power, condensing the working vapor from said power producing device into a liquid condition to form a working liquid, and pressurizing and recirculating said working liquid to effect introduction thereof into said pressure vessel on a continuous basis.

3. The method as set forth in claim 2 further including venting any noncondensable gas in said vapor effluent prior to said pressurizing and recirculating step.

4. The method as set forth in claim 2 wherein said pressure vessel includes a liquid zone disposed below a boiling region, said working liquid being introduced into said liquid zone and said heated fluid source being introduced into said boiling zone whereby said working liquid is admixed with the fluid source material in the liquid zone and flows upwardly to said boiling region while said source material flows downwardly from said boiling region towards said liquid zone.

5. The method as set forth in claim 4 further including demisting the vapor effluent subsequent to formation thereof and prior to introduction thereof into said power device.

6. The method as set forth in claim 2 further including the step of injecting a small amount of pure aqueous fluid into said fluid source material prior to flow into said pressure vessel to prevent accumulation of solid material.

7. The method as set forth in claim 2 wherein the working vapor from said power producing device is flowed through a regenerative heat exchanger, flowing a portion of the working fluid through said regenerative heat exchanger to vaporize the same, flowing the working fluid vaporized in the regenerative heat exchanger through a second power producing device.

8. The method as set forth in claim 2 further including flowing the withdrawn fluid source material into a second pressure vessel while introducing additional working liquid into said second vessel to effect contact therebetween to vaporize said additional working liquid, flowing said additionally vaporized working liquid into a regenerative heat exchanger and then to a second power producing device, flowing the vaporized liquid from said power producing device through said regenerative heat exchanger, and condensing, pressurizing and recirculating said vapor from said working liquid and said additional working liquid.

9. A method of generating power from a heated aqueous fluid source material selected from the group consisting of geothermal and solar heated source fluids, and waste heat water solutions from power plants and industrial processes, which may contain dissolved solutes therein, comprising the steps of:

bringing a transfer fluid into direct heat transfer relationship with the heated fluid source material to effect transfer of heat from said source material to said transfer fluid, bringing said transfer fluid into direct heat transfer relationship with a working fluid to effect transfer of heat to said working fluid to vaporize the working fluid to form a working vapor effluent, said step of direct heat transfer from said transfer fluid to said working fluid being conducted in a third fluid in which at least said working fluid is substantially insoluble so as to prevent loss of at least said working fluid, condensing said vapor effluent to a working liquid after said vapor has passed through said power extracting device, pressurizing and recirculating said working liquid to carry out the process on a continuous basis, and recirculating said transfer fluid to carry out the process on a continuous basis.

10. A method as set forth in claim 9 wherein said step of direct heat transfer from said transfer fluid to said working fluid including bringing said transfer fluid into direct heat transfer relationship with a saturated solution of a salt dissolved in an aqueous medium thus forming an intermediate hot energy fluid source material, and bringing said intermediate hot energy fluid source material into contact with said working fluid such that said intermediate hot energy fluid source material functions as a transfer fluid to transfer heat to said working liquid.

11. The method as set forth in claim 10 wherein a pure fluid is introduced at selected points in the process flow to contact surfaces of the process equipment to prevent accumulation of solid particulate material on such surfaces.

12. The method of claim 9 wherein the working vapor from said power producing device is flowed through a regenerative heat exchanger, flowing a portion of the working fluid through said regenerative heat exchanger to vaporize the same, flowing the working fluid vaporized in the regenerative heat exchanger through a second power producing device.

13. The method as set forth in claim 9 wherein said power extracting device is a multi-stage power extracting device.

14. The method as set forth in claim 9 further including venting any noncondensable gas present during contact between the hot energy fluid source material and said transfer fluid.

15. The method as set forth in claim 10 further comprising venting any noncondensable gas during contact between the transfer fluid and the intermediate hot energy source fluid.

16. The method as set forth in claim 9 wherein said hot fluid source includes vapor containing noncondensable gases.

17. Apparatus for use in an energy conversion system comprising:

means forming a reactor vessel including a liquid zone and a boiling region vertically above the liquid zone, means to introduce a hot energy aqueous source material selected from the group consisting of geothermal and solar heated source fluids, and waste heat water solutions from power plants and industrial processes, into the boiling region of said reactor, a source of working fluid, means to introduce said working fluid into the liquid zone of said reactor for upward flow of said working fluid into direct heat exchange contact with said heat source material whereby said working fluid is vaporized and said source material is cooled, means in said vessel for flowing at least a portion of said working fluid along the walls of said vessel to minimize precipitation of dissolved solutes on the walls of said vessels, the portion of said vessel between said boiling region and said means to introduce said working fluid being substantially free of internal packing, trays and baffles and the like, to minimize precipitation of solutes from said cooled aqueous source material, means to maintain said vessel at a working pressure such that the combined vapor pressure of the heated aqueous source material and of the working fluid is equal to said working pressure thereby to effect boiling of the mixture, the temperature of boiling of said mixture being lower than the individual boiling points of each of the aqueous source material and of the working fluid at said working pressure whereby said working fluid is vaporized and said source material is cooled, means for withdrawing vaporized working fluid from said reactor, condenser means connected to receive said vaporized working fluid to effect condensation thereof to a working liquid, means to remove said cooled source material from said reactor, and means to pressurize and recirculate said working fluid into said reactor.

18. Apparatus as set forth in claim 17 including power generating means connected to receive the vaporized working fluid from said reactor and to flow said vaporized working fluid to said condensor means.

19. Apparatus as set forth in claim 17 wherein said reactor includes inclined walls in said liquid zone.

20. Apparatus as set forth in claim 17 including staged power generating means and regenerative heat exchanger means.

21. Apparatus as set forth in claim 20 further including second reaction means receiving the cooling source material from said reactior, means to introduce a working fluid into said second reactor for direct heat exchanger contact with the cooled source material to form a second working fluid vapor, staged power generating means connected to receive the vaporized working fluid from said reactors, and regenerative heat exchanger means receiving the vapor from one stage of power generating means and vapor from said second reactor, said vapor from said reactor being flowed to another stage of said staged power generating means.

22. Apparatus as set forth in claim 18 further including additional reactor chambers cooperating with said reaction vessel,     one reactor chamber receiving a hot energy source fluid and a transfer fluid to effect direct contact therebetween and exchanger to heat to said transfer fluid,     means cooperating with said one reactor chamber to effect flow of said transfer fluid into heat exchanger relative with the working fluid.

* * * * *